US012518009B2

United States Patent
Yan et al.

(10) Patent No.: US 12,518,009 B2
(45) Date of Patent: Jan. 6, 2026

(54) SYSTEM AND METHOD FOR DETECTING EXPLOIT INCLUDING SHELLCODE

(71) Applicant: Palo Alto Networks, Inc., Santa Clara, CA (US)

(72) Inventors: Tao Yan, San Jose, CA (US); Jin Chen, San Jose, CA (US); Bo Qu, Saratoga, CA (US); Jiangxia Liu, Cupertino, CA (US); Edouard Bochin, Montreal (CA); Royce Lu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 303 days.

(21) Appl. No.: 17/587,636

(22) Filed: Jan. 28, 2022

(65) Prior Publication Data
US 2023/0244787 A1    Aug. 3, 2023

(51) Int. Cl.
G06F 21/56    (2013.01)
G06F 21/53    (2013.01)

(52) U.S. Cl.
CPC ............ *G06F 21/566* (2013.01); *G06F 21/53* (2013.01); *G06F 21/568* (2013.01)

(58) Field of Classification Search
CPC ...... G06F 21/566; G06F 21/53; G06F 21/568; G06F 21/564
See application file for complete search history.

(56) References Cited

U.S. PATENT DOCUMENTS

| 9,973,531 | B1  | 5/2018  | Thioux |
| 10,860,718 | B2 | 12/2020 | Seetharamaiah |
| 2009/0158431 | A1* | 6/2009 | Kim ............... H04L 63/1416 726/23 |
| 2011/0197177 | A1* | 8/2011 | Mony .................. G06F 8/51 717/115 |
| 2014/0181976 | A1* | 6/2014 | Snow ............... G06F 21/554 726/23 |

(Continued)

FOREIGN PATENT DOCUMENTS

| JP | 2002055851 | 2/2002 |
| JP | 2014504765 | 2/2014 |

(Continued)

OTHER PUBLICATIONS

Buhov, Damjan; Thron, Richard; Schrittwieser, Sebastian; "Catch Me if You Can! Transparent Detection of Shellcode," International Conference on Software Security and Assurance (ICSSA), Saint Pölten, Austria, IEEE, Aug. 24-25, 2016, pp. 60-63.*

(Continued)

*Primary Examiner* — Victor Lesniewski
(74) *Attorney, Agent, or Firm* — Van Pelt, Yi & James LLP

(57) ABSTRACT

Detection of an exploit including shellcode is disclosed. Memory blocks are monitored during dynamic analysis of a sample to identify a memory block including suspicious shellcode. The memory block is dumped in memory to identify a candidate shellcode entry point associated with the suspicious shellcode. The suspicious shellcode is executed based on the candidate shellcode entry point to determine whether the suspicious shellcode is malicious. A verdict is generated regarding the sample based on results of executing the suspicious shellcode.

18 Claims, 13 Drawing Sheets

(56) References Cited

U.S. PATENT DOCUMENTS

| | | | | |
|---|---|---|---|---|
| 2015/0188933 | A1* | 7/2015 | Zeitlin | G06F 21/53 726/22 |
| 2015/0213260 | A1* | 7/2015 | Park | G06F 21/566 726/23 |
| 2016/0381043 | A1* | 12/2016 | Yamada | G06F 21/554 726/23 |
| 2017/0116417 | A1* | 4/2017 | Jhi | G06F 21/566 |
| 2017/0185536 | A1* | 6/2017 | Li | G06F 11/302 |
| 2018/0018460 | A1* | 1/2018 | Brown | G06F 21/554 |
| 2018/0025158 | A1* | 1/2018 | Malachi | G06F 21/51 726/23 |
| 2018/0089432 | A1* | 3/2018 | Malachi | G06F 21/53 |
| 2018/0129807 | A1* | 5/2018 | Azarafrooz | G06F 21/552 |
| 2019/0005236 | A1* | 1/2019 | Singh | G06F 21/566 |
| 2019/0102552 | A1* | 4/2019 | Pavlyushchik | G06F 21/566 |
| 2019/0205537 | A1* | 7/2019 | Das | G06F 21/566 |
| 2020/0089883 | A1* | 3/2020 | Morris | G06F 21/52 |
| 2022/0222338 | A1* | 7/2022 | Gupta | G06F 21/554 |
| 2022/0366047 | A1* | 11/2022 | Zhou | G06N 3/045 |

FOREIGN PATENT DOCUMENTS

| | | |
|---|---|---|
| JP | 2017500668 | 1/2017 |
| JP | 2018041438 | 3/2018 |
| WO | 2014050424 | 4/2014 |

OTHER PUBLICATIONS

Yousaf, M Shahid; Durad, Muhammad Hanif; Ismail, Maleeha; "Implementation of Portable Executable File Analysis Framework (PEFAF)," 16th International Bhurban Conference on Applied Sciences and Technology (IBCAST), Islamabad, Pakistan, IEEE, Jan. 8-12, 2019, pp. 671-675.*

Cheng, et al. "A Shellcode Detection Method Based on Full Native API Sequence and Support Vector Machine." IOP Conference Series: Materials Science and Engineering. vol. 242. No. 1. IOP Publishing, 2017.

Mosli et al., "A Behavior-based Approach for Malware Detection", Chapter 11 of "Advances in Digital Forensics XIII." by Peterson et al., Springer International Publishing, 2017. pp. 187-201.

Sehatbakhsh et al. "REMOTE: Robust external malware detection framework by using electromagnetic signals." IEEE Transactions on Computers 69.3 (2019): 312-326.

Sihwail et al. "Malware detection approach based on artifacts in memory image and dynamic analysis." Applied Sciences 9.18 (2019): 3680.

Tang et al., "Unsupervised anomaly-based malware detection using hardware features." International Workshop on Recent Advances in Intrusion Detection. Springer, Cham, 2014.

Iwamoto et al., Proposal for Shellcode Extraction from Malicious Document File, Research Report of Information Processing Society of Japan, Computer Security (CSEC) vol. 2014-CSEC-65 No. 13, May 22, 2014, 7 pages.

* cited by examiner

EXAMPLE OF AN EXPLOIT - CVE-2015-5119

Only 1 binary/suspicious shellcode is dumped with the filter.
2 hits by regex patterns in the shellcode filter:
One is at offset 0x406d, hit by the call function pattern.

| | | | | | | | | | | | | | | | | |
|---|---|---|---|---|---|---|---|---|---|---|---|---|---|---|---|---|
| 4050h: | 4C | CF | 66 | 04 | 4F | 59 | E2 | 6B | 00 | 40 | F4 | 05 | 00 | 80 | 00 | 00 | Lïf.OYâk.@ô.€.. |
| 4060h: | 00 | 10 | 00 | 00 | 40 | 00 | 00 | 00 | 6C | 80 | F4 | 05 | 60 | E8 | 05 | 00 | ...@...l€ô.`è.. |
| 4070h: | 00 | 00 | 61 | 89 | FC | 5D | C3 | 90 | 55 | 89 | E5 | FC | 81 | EC | E8 | 00 | ..a‰ü]Ã.U‰åü.ìè. |
| 4080h: | 00 | 00 | 89 | E6 | B8 | 06 | E2 | AD | 32 | 50 | E8 | CE | 0B | 00 | 00 | 85 | ..‰æ¸.â-2PèÎ...… |
| 4090h: | C0 | 0F | 84 | E2 | 00 | 00 | 00 | 50 | E8 | 4A | 0C | 00 | 00 | 89 | 46 | 24 | À..â...PèJ...‰F$ |
| 40A0h: | B8 | 17 | CA | 2B | 6E | 50 | E8 | B2 | 0B | 00 | 00 | 85 | C0 | 0F | 84 | C6 | ¸.Ê+nPè²...À..Æ |
| 40B0h: | 00 | 00 | 00 | 89 | 06 | 66 | B8 | FF | E7 | E8 | CC | 00 | 00 | 00 | 85 | C0 | ...‰.f¸ÿçèÌ...À |
| 40C0h: | 0F | 84 | B3 | 00 | 00 | 00 | 89 | 86 | 84 | 00 | 00 | 00 | E8 | 0D | 00 | 00 | ..³...‰†„...è... |
| 40D0h: | 00 | 43 | 72 | 65 | 61 | 74 | 65 | 54 | 68 | 72 | 65 | 61 | 64 | 00 | 58 | 8B | .CreateThread.X‹ |

The other is at offset 0 x4c68, hit by TEB access pattern.

| | | | | | | | | | | | | | | | | |
|---|---|---|---|---|---|---|---|---|---|---|---|---|---|---|---|---|
| 4C50h: | 88 | 00 | 00 | 00 | 89 | 4D | 04 | 89 | EC | 5D | C2 | 04 | 00 | 55 | 89 | E5 | ˆ...‰M.‰ì]Â..U‰å |
| 4C60h: | 51 | 52 | 56 | 83 | EC | 04 | 31 | C0 | 64 | 8B | 50 | 18 | 8B | 52 | 30 | 8B | QRVƒì.1Àd‹P.‹R0‹ |
| 4C70h: | 52 | 0C | 8B | 72 | 1C | 89 | F2 | 83 | FA | 00 | 74 | 30 | 8B | 52 | 08 | 8B | R.‹r.‰òƒú.t0‹R.‹ |
| 4C80h: | 4A | 3C | 8D | 0C | 0A | 8B | 49 | 78 | 8D | 0C | 0A | 8B | 49 | 0C | 8D | 04 | J<.‹Ix...‹I... |
| 4C90h: | 0A | FF | 75 | 08 | 50 | E8 | 1E | 00 | 00 | 00 | 84 | C0 | 75 | 0E | 3B | 16 | .ÿu.Pè...„Àu.;. |

Dynamic assembly code pattern match detection
results by emulative execution in CPU emulator

[!] TEB was accessed!
mov edx, dword ptr fs: [eax + 0x18]
[!] PEB was accessed!
mov edx, dword ptr [edx + 0x30]
[!] PEB Ldr was accessed!
mov edx, dword ptr [edx + 0xc]

| | | |
|---|---|---|
| 08b5106c | 60 | pushad |
| 08b5106d | e805000000 | call 08b51077 |
| 08b51072 | 61 | popad |
| 08b51073 | 89fc | mov esp,edi |
| 08b51075 | 5d | pop ebp |
| 08b51076 | c3 | ret |
| 08b51077 | 90 | nop |
| 08b51078 | 55 | push ebp |
| 08b51079 | 89e5 | mov ebp,esp |
| 08b5107b | fc | cld |
| 08b5107c | 81ece8000000 | sub esp, 0E8h |
| 08b51082 | 89e6 | mov esi,esp |
| 08b51084 | b806e2ad32 | mov eax, 32ADE206h |
| 08b51089 | 50 | push eax |
| 08b5108a | e8ce0b0000 | call 08b51c5d |

| | | |
|---|---|---|
| 08b51c5d | 55 | push ebp |
| 08b51c5e | 89e5 | mov ebp, esp |
| 08b51c60 | 51 | push ecx |
| 08b51c61 | 52 | push edx |
| 08b51c62 | 56 | push esi |
| 08b51c63 | 83ec04 | sub esp, 4 |
| 08b51c66 | 31c0 | xor eax, eax |
| 08b51c68 | 648b5018 | mov edx, dword ptr fs:[eax+18h] |
| 08b51c6c | 8b5230 | mov edx, dword ptr [edx+30h] |
| 08b51c6f | 8b520c | mov edx, dword ptr [edx+0Ch] |
| 08b51c72 | 8b721c | mov esi, dword ptr [edx+1Ch] |

API monitoring detection results by real execution in full system emulator

File  Edit  Format  View  Help

LdrGetProcedureAddress(C:\windows\system32\kernel32.dll, CreateThread)
NtCreateThreadEx
LdrGetProcedureAddress(C:\windows\system32\kernel32.dll, DecodePointer)

Figure 12

SYSTEM AND METHOD FOR DETECTING EXPLOIT INCLUDING SHELLCODE

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. As techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 12 illustrates an example of a process for detecting an exploit including shellcode.

DETAILED DESCRIPTION

Figure 1:
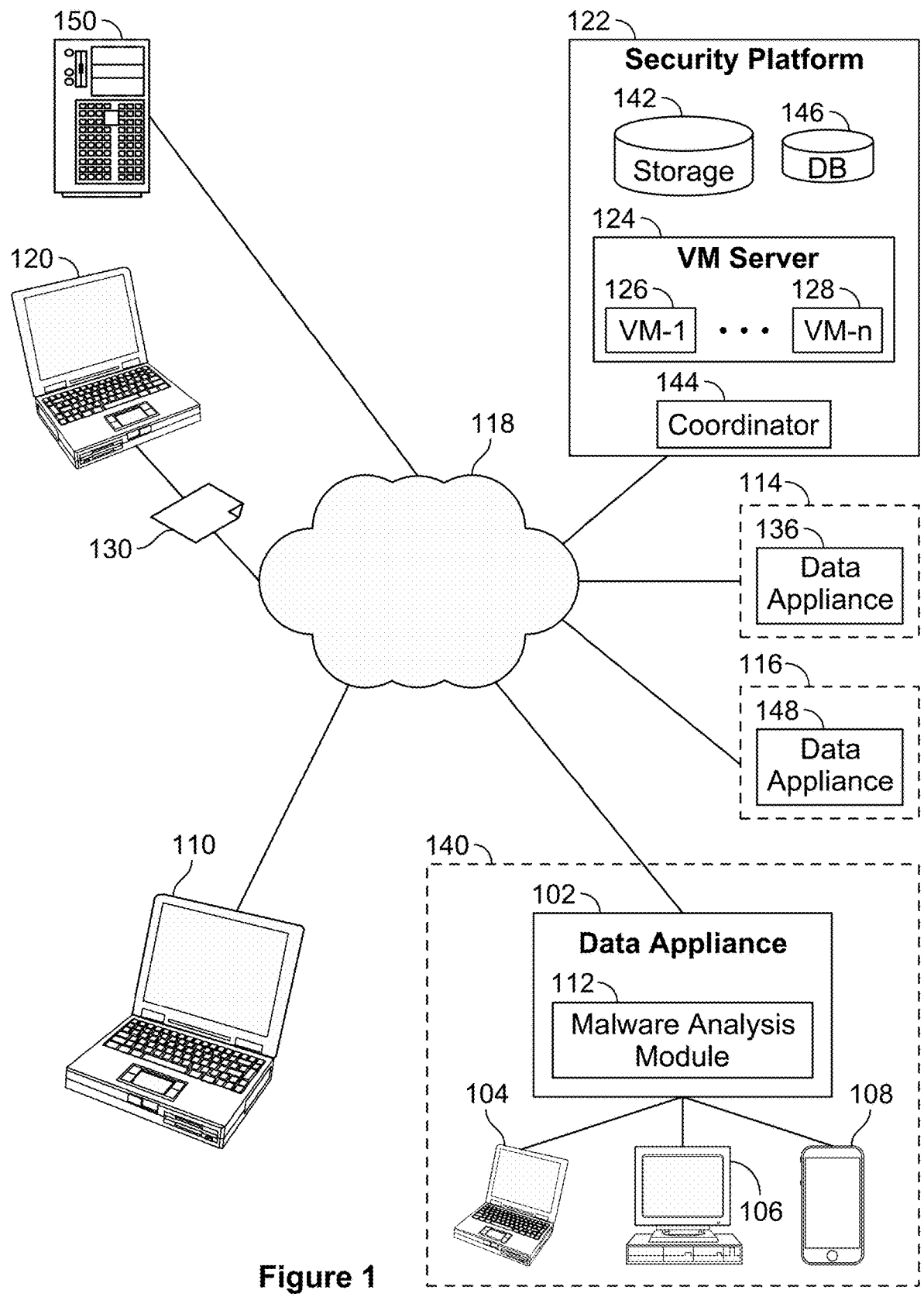
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Typically, exploits use memory attribute change functions to bypass operating system mitigations to execute malicious shellcode (a snippet of binary data) in a victim's computer. Existing exploit detection techniques only work in specific scenarios each of which have their own limitations. Before executing the malicious shellcode, the shellcode is placed into a target process memory as legal data. For example, in a browser exploit, attackers utilize JavaScript to construct an exploit and the shellcode is written into a browser process as a typical JavaScript object (e.g., string or array) by a browser's JavaScript engine and stored in a legal heap where the legal heap exists as data (not as code and cannot be executed). Subsequently, the exploit triggers a vulnerability and controls the instruction pointer register (IP register). In modern operating systems (e.g., Windows, MacOS, Linux, etc.), data execution prevention (DEP) prevents the shellcode from executing in memory by marking the memory as non-executable. However, the exploit bypasses DEP and has the shellcode executed.

Typically, the exploit bypasses the DEP by calling a memory attribute change function. Exploits can use return-oriented programming (ROP) gadgets to construct an ROP chain to call the memory attribute change function (e.g., VirtualAlloc and VirtualProtect on Window, and mmap and mprotect for MacOS and Linux) to mark memory containing the shellcode as Read|Write|Execute (RWE) and then execute the shellcode. Typically, the exploits have the same privileges as a vulnerable application or a vulnerable software process, such as a browser renderer process.

In some embodiments, a system/method/computer program product for detecting an exploit including shellcode includes monitoring memory blocks during dynamic analysis of a sample to identify a memory block including suspicious shellcode; dumping the memory block in memory to identify a candidate shellcode entry point associated with the suspicious shellcode; executing, based on the candidate shellcode entry point, the suspicious shellcode to determine whether the suspicious shellcode is malicious; and generating a verdict regarding the sample based on results of executing the suspicious shellcode.

In some embodiments, the monitoring of the memory blocks during the dynamic analysis of the sample to identify the memory block including the suspicious shellcode includes hooking a memory attribute change function associated with a memory block to determine whether the memory attribute change function has been called and a corresponding parameter has been provided to the memory attribute change function; and in response to a determination that the memory attribute change function has been called and the corresponding parameter has been provided to the memory attribute change function, determining that the memory block includes suspicious shellcode.

In some embodiments, the monitoring of the memory blocks during the dynamic analysis of the sample to identify the memory block including the suspicious shellcode includes performing an offline scanning of process memory to determine whether the memory blocks have a specific memory attribute; and in response to a determination that the memory block has the specific memory attribute, determining that the memory block includes the suspicious shellcode.

In some embodiments, the dumping of the memory block in the memory to identify the candidate shellcode entry point associated with the suspicious shellcode includes identifying a specific assembly code pattern or a specific data structure in the memory block including the suspicious shellcode; and determining the candidate shellcode entry point based on the specific assembly code pattern or the specific data structure.

In some embodiments, the executing of the suspicious shellcode includes executing, based on the candidate shellcode entry point, the suspicious shellcode using a CPU emulator; and executing, based on the candidate shellcode entry point, the suspicious shellcode using a full system emulator.

In some embodiments, the executing of the suspicious shellcode using the CPU emulator includes emulating execution of the suspicious shellcode using the CPU emulator; determining whether assembly instructions associated with the emulated execution of the suspicious shellcode matches a predetermined shellcode pattern; and in response to a determination that the assembly instructions associated with the emulated execution of the suspicious shellcode matches the predetermined shellcode pattern, determining that the suspicious shellcode is malicious.

In some embodiments, the executing of the suspicious shellcode using the full system emulator includes executing the suspicious shellcode in the memory inside an operating system running in the full system emulator; monitoring hooked application programming interface (API) functions to determine whether the suspicious shellcode calls a hooked API function; and in response to a determination that the suspicious shellcode calls the hooked API function, determining that the suspicious shellcode is malicious.

In some embodiments, a system/method/computer program product further includes in response to a determination that the verdict indicates that the sample is malicious, generating a signature for the malware sample.

In some embodiments, a system/method/computer program product further includes, in response to a determination that the verdict indicates that the sample is malicious: generating a signature for the malware sample; and distributing the signature to a firewall.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware).

Techniques described herein can be used in conjunction with a variety of platforms (e.g., desktops, mobile devices, gaming platforms, embedded systems, etc.) and/or a variety of types of applications across a variety of CPU architectures (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
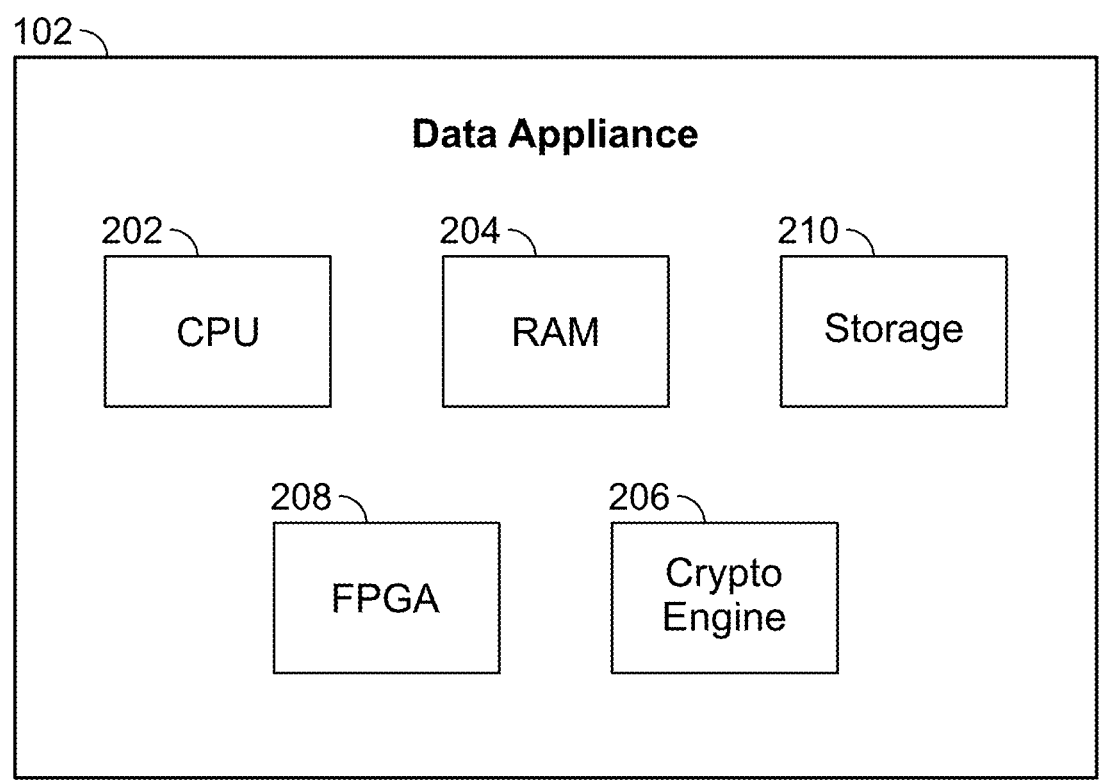
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
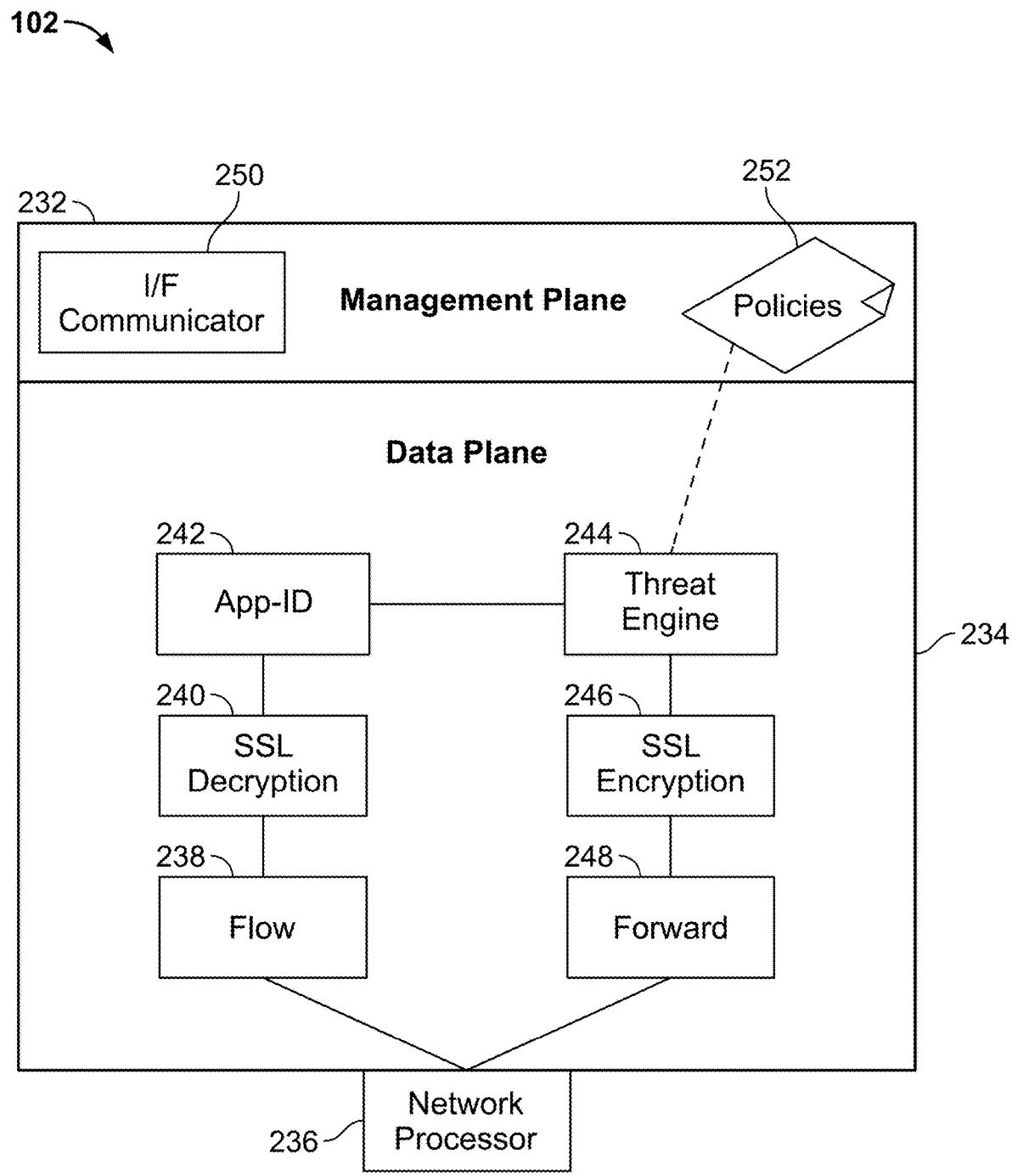
FIG. 2B is a functional diagram of logical components in an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL, URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, suppose a malicious individual (using system 120) has created malware 130. The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or web site download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140).

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm.

As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. An alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, in various embodiments, security platform 122 performs static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel-based Virtual Machine (KVM), VMware ESXi, Citrix XenServer, and Microsoft Hyper-V. Custom virtualization software can also be used and/or the functionality of commercially available virtualization software extended as needed to support various functionality described herein (e.g., as being provided by a hypervisor). Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

IV. Analyzing Samples Using Static/Dynamic Analysis

Figure 3:
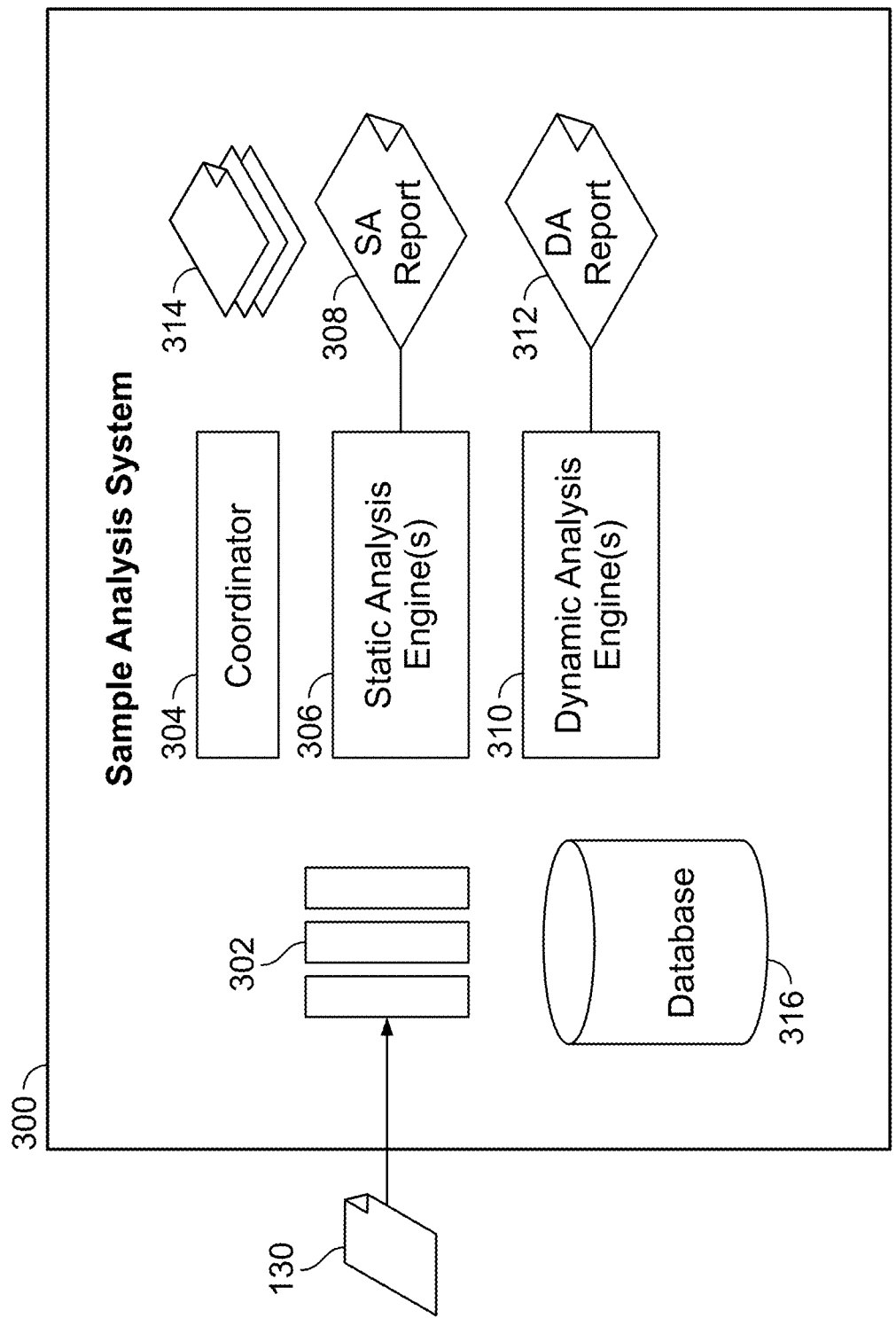
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122, or as a separate device located within network 140 and in communication with data appliance 102 (e.g., comprising various applicable components described herein as being provided by security platform 122, such as virtual machine server 124).

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static analysis report information can be used to help select/customize/configure the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat).

Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Simulating User Interactions for Malware Analysis

Malware authors are using increasingly sophisticated techniques when crafting their malware so that it evades detection by security analysis systems. One such technique is to have the malware attempt to determine whether it is executing in a virtual machine environment, and if so, to refrain from executing or otherwise not engage in malicious activities. By doing so, a security analysis system may erroneously conclude that the malware sample is benign because it is not observed by the security analysis system to engage in malicious behavior during dynamic analysis. As will be described in more detail below, in various embodiments, platform 122 and/or data appliance 102, or other component or components, as applicable, make use of techniques to help thwart detection by malware samples that they are being executed in virtualized environments. By preventing malware samples from determining that they are being executed in virtualized environments, successful detection of the samples as being malicious is more likely to occur as the malware samples will more likely engage in malicious behavior while being executed in the virtualized environment.

One way that malware can determine whether it is executing in a virtual machine environment is by looking for indicia that it is being manipulated/executed by the guest operating system. As an example, in a typical virtualized environment, a sample to be tested (e.g., sample 130) might be renamed (e.g., from its original name as observed by data appliance 102) to a default name, such as "sample.exe." A script (e.g., "autoexec.bat") will automatically be executed at startup by the guest operating system and directly launch or cause the launching of the sample (e.g., by a dynamic analysis helper tool). Since the malware sample and dynamic analysis help script/tools are all collocated within the user space of the guest OS, the presence of the dynamic analysis script/tools on the guest OS will be visible to the malware, as will information such as that the malware was started by the script (or tool) and/or that the malware has been renamed. Further, the dynamic analysis helper tool may make use of OS API calls (e.g., instructing the operating system to take various actions such as keyboard entry). Use of those API calls by the dynamic analysis helper tool can be observed by the malware. If the executing sample determines that it is being executed in a virtualized environment, it can refrain from engaging in malicious actions and evade being flagged as malicious by a dynamic analysis system.

Another way that malware can determine whether it is executing in a virtual machine environment is by looking for indicia that a human is interacting with the system on which the malware is executing. If a human does not appear to be interacting with the system, the malware may refrain from engaging in malicious actions. As one example, a malicious document may only engage in malicious behavior after a certain set of actions has been taken within the word processing application used to launch the malicious document (e.g., scrolling down four pages using a mouse, or performing a certain number of mouse clicks). As another example, a malicious spreadsheet comprising multiple worksheets may refrain from taking malicious actions until each worksheet has been clicked on with a mouse.

Some virtualized dynamic analysis environments may attempt to replicate user behavior through scripting/hooks (e.g., using guest OS API calls to press keyboard keys or move the position of the mouse). However, increasingly sophisticated malware is aware of when such OS API calls are used and can thus detect such interactions as being automatically generated by a dynamic analysis system instead of being made by a human end user. As such, malicious documents may require more complex indicia of human use that does not lend itself to scripting (e.g., scrolling down four pages using a mouse, performing a certain number of mouse clicks, etc.) before exhibiting malicious behavior.

A. Example Environment

Figure 4:
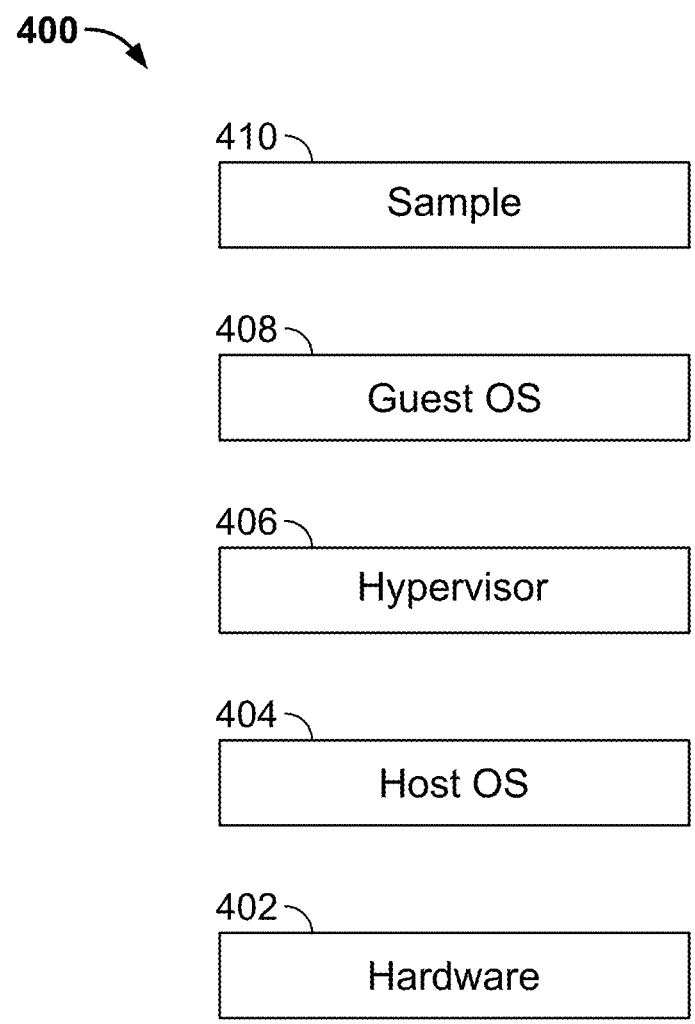
FIG. 4 illustrates an embodiment of an environment for analyzing malware samples.

FIG. 4 illustrates an embodiment of an environment for analyzing malware samples. Environment 400 is an example of components that can be included in system 300 (e.g., as dynamic analysis engine 310). In the example shown in FIG. 4, a dynamic analyzer host OS (404), such as Ubuntu for x86_64, runs on appropriate hardware (402), such as Intel x86 or x86_64 based hardware. A hypervisor (406) runs a virtual machine that has a guest OS (408) of a type appropriate for the sample being analyzed (e.g., 64-bit Windows 7 SP 2 or MacOS X) and, as applicable, various applications pre-installed (e.g., Microsoft Office, Adobe Acrobat, Mozilla Firefox, Safari, etc.).

As previously mentioned, when performing dynamic analysis in a virtualized environment, one approach is for sample 410 to be launched by a script or tool executing within guest OS 408. For example, a helper tool installed on guest OS 408 can rely on Windows APIs to detect message boxes and new items on the desktop, perform keyboard presses and movements, etc. However, as mentioned above, one drawback of this approach is that it can allow the malware to detect that it is executing in/manipulated by guest OS 408 and cause it to refrain from exhibiting malicious behaviors to evade detection.

An alternate approach (used by various embodiments of security platform 122, malware analysis module 112, sample analysis system 300, etc.) does not rely on the guest OS to simulate user actions, but instead uses hypervisor 406. In particular, and as will be described in more detail below, frame buffer data stored by the graphics card is directly accessed by the hypervisor to generate screenshots of the virtualized system's desktop for analysis, and device drivers such as the mouse device driver are hooked so that the hypervisor can move the virtualized mouse directly, as an end user would, without making guest OS API calls. Since guest OS API calls are not used to simulate human activity, the malware sample (410) will be unable to detect that it is running in a virtualized environment and thus will not conceal its malicious behavior during analysis.

VI. Analyzing Malware Samples

Typically, during static analysis, malware is detected by determining whether a signature of a sample matches a pattern associated with known malware. However, some of the limits of conventional static analysis for determining whether samples are malicious exploits include new exploit codes that can easily be obfuscated. For example, a browser exploit can be obfuscated using JavaScript to avoid being detected by static analysis.

Some of the limits of conventional dynamic analysis of samples to determine whether the samples are malicious include when detecting sensitive API function calls via a hooking technique, there can be only a small number of sensitive API function calls such as, for example, CreateProcess and URLDownloadToFile in the Windows Operating System that are useful in detecting malware. Typically, applications such as a browser, Adobe Reader, Microsoft Office never call one of the small number of sensitive API function calls, so samples that call the small number of sensitive API function calls can be determined to be malicious. On the other hand, there are many other API function calls that are also used by the application itself legitimately (e.g., LoadLibrary, CreateThread, etc.). In some scenarios, LoadLibrary is associated with malware, and in some scenarios, LoadLibrary is used by an application itself for legitimate behaviors. Determining which API function calls correspond with legitimate behavior and which API function calls correspond with malicious behavior are not easily determined, so conventional dynamic analysis is limited in its effectiveness.

In the present application, before executing shellcode, an exploit marks the memory including the shellcode as Read-|Write|Execute (RWE) using a memory attribute change function to bypass the DEP mitigation. Examples of a memory attribute change function include: VirtualAlloc and VirtualProtect in the Windows Operating System. Other operating systems such as MacOS, Linux, etc. will have their own corresponding specific memory attribute change functions (e.g., mmap and mprotect).

Figure 5:
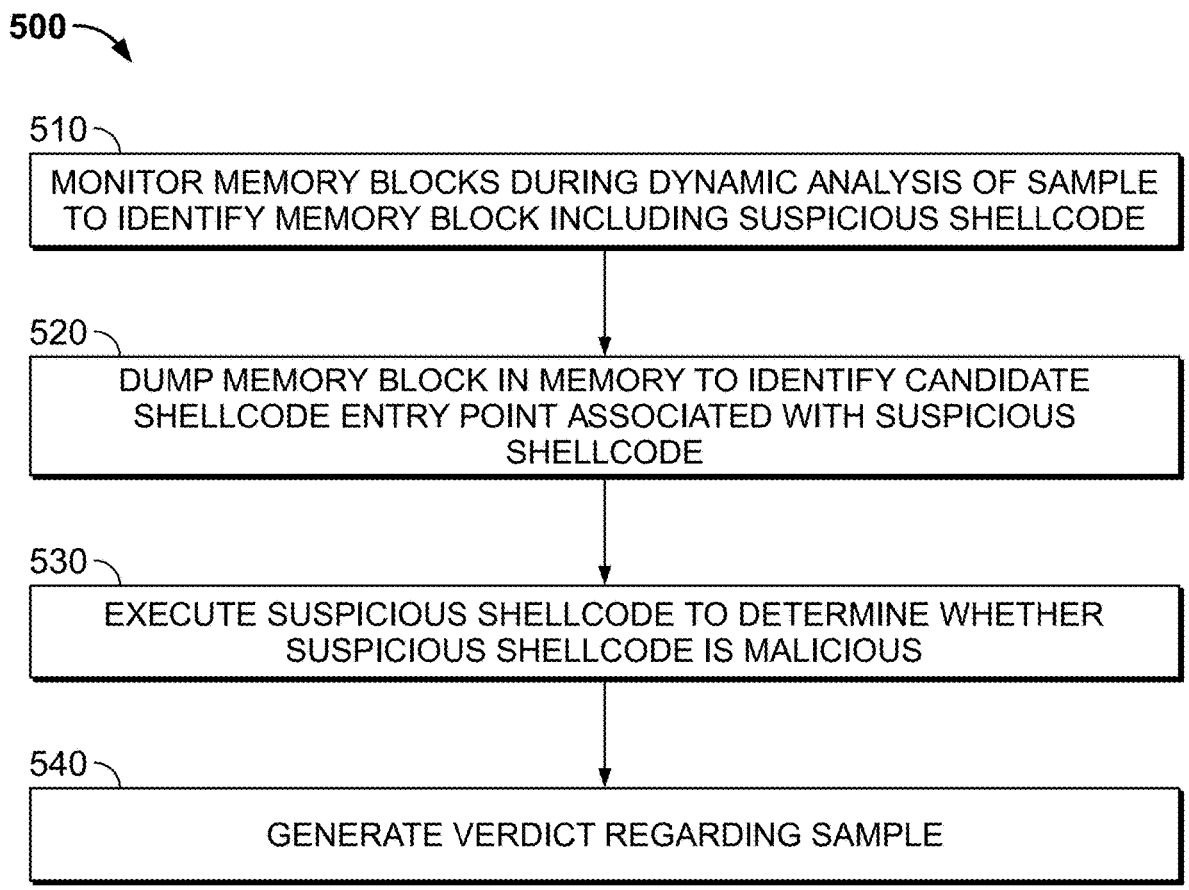
FIG. 5 illustrates an embodiment of a process for detecting an exploit including shellcode.

FIG. 5 illustrates an embodiment of a process for detecting an exploit including shellcode. In some embodiments, the process 500 is performed using the environment 400 of FIG. 4 and comprises:

In 510, the environment monitors memory blocks during dynamic analysis of a sample to identify a memory block including suspicious shellcode.

For PDF files, the environment can use Adobe Acrobat or Adobe Reader to identify suspicious shellcode; for Word documents, Excel documents, and PowerPoint documents, the environment can use MS Office to identify suspicious shellcode; and for HTML files or JavaScript files, the environment can use Chrome or another browser to identify suspicious shellcode.

In some embodiments, a memory block relates to a heap.

In a first technique, the environment can hook memory attribute change functions, for example, VirtualAlloc and VirtualProtect in the Windows Operating System, and in the event that a memory attribute change function is called for a memory block, the environment can flag the memory block as suspicious shellcode.

In some embodiments, after the memory attribute change function is identified, the environment determines whether corresponding parameters for the memory attribute change function grant the memory block execute permissions (RWE), and in the event that the corresponding parameters do not grant the memory block with execute permissions (e.g., removes execute permissions or only grants write permissions), the environment ignores the memory block.

In a second technique, the environment can perform an offline scanning process of memory to determine whether a memory block has had its memory attribute set to RWE. In the event that the memory block has had its memory attribute set to RWE, the environment can flag the memory block as including suspicious shellcode.

In the event that the offline scanning of process memory is performed, the environment analyzes the process memory (after the sample is executed or at different times during the execution) via a memory dump, and the dumped process memory is parsed offline to identify memory having a memory attribute as RWE and then mark the memory as including suspicious shellcode. In other words, memory blocks associated with the marked memory were given execute permissions during the execution of the sample.

In 520, the environment dumps the memory block in memory to identify a candidate shellcode entry point associated with the suspicious shellcode.

After identifying memory blocks including the suspicious shellcode, the environment can input the memory blocks including the suspicious shellcode into a shellcode filter to identify candidate shellcode entry points. The shellcode filter includes a list of regex expressions. The regex expressions can relate to shellcode characteristics such as, for example, data structure access (process environmental blocks (PEB) access/thread environmental blocks (TEB) access), GETPC techniques (GETPC with "call reg, pop reg," which uses a combination of the assembly instructions "call" and "pop" to put the current instruction register (IP) address to the assigned register for further shellcode self-decoding or decryption, and GETPC with "fnstenv," which uses a float assembly instruction characteristic to push the current instruction register (IP) address to the stack for further shellcode self-decoding or decryption)), no operation (NOP) instructions which are usually used by shellcode as a shellcode entry point, etc.

In some embodiments, the shellcode entry point is identified based on the regex expression. For example, a shellcode entry point starts from or near PEB/TEB access instructions, GETPC instructions, function call instructions, NOP instructions, etc.

As an aspect, in the event that the shellcode is encrypted or encoded to evade the static analysis, the encoded shellcode is to first call a GETPC instruction such as "call reg; pop reg" or "fnstenv" to get the current instruction register (IP) address for shellcode decryption or decoding. As another aspect, the shellcode includes nop instructions at the beginning of a sample to smoothly transition to malicious shellcode after the end of the nop instructions.

In 530, the environment executes, based on the candidate shellcode entry point, the suspicious shellcode to determine whether the suspicious shellcode is malicious.

In some embodiments, the environment executes the suspicious shellcode in a CPU emulator and to obtain an input binary and executes the input binary in a full system emulator. In some embodiments, the environment executes the suspicious shellcode in a CPU emulator and executes the suspicious shellcode in a full system emulator. In some embodiments, the environment executes the suspicious shellcode in only a CPU emulator. In some embodiments, the CPU emulator is Unicorn or Qiling. In some embodiments, the environment identifies assembly instruction level shellcode patterns (e.g., GETPC instructions, self-decode, PEB/TEB access, etc.) to detect shellcode in the input suspicious shellcode in the CPU emulator. Typically, shellcode has fixed patterns, fixed characteristics and/or fixed behaviors. By detecting the shellcode, the exploit can be detected. In some embodiments, to obtain faster detection results (e.g., lowest sample processing time), the environment can generate a verdict if the suspicious shellcode is only executed in the CPU emulator.

In some embodiments, the full system emulator is QEMU, which can run an operating system to provide full system emulation. In some embodiments, the environment executes the suspicious shellcode in the memory inside an operating system running in the full system emulator and contemporaneously monitors API function calls which the shellcode calls to detect shellcode from the input suspicious shellcode. In some embodiments, the environment determines that the suspicious shellcode is malicious in the event that a monitored API function call is detected during the full system emulation and/or an assembly instruction level shellcode pattern is triggered during the CPU emulation.

In some embodiments, because the CPU emulation is performed for efficiency and then, if necessary, the full system emulation is performed, the two emulations are complementary to each other.

In 540, the environment generates a verdict regarding the sample based on results of executing the suspicious shellcode.

In some embodiments, in the event that the suspicious shellcode is determined to be malicious, the sample is determined to be an exploit. In some embodiments, after the sample is determined to be malicious, the environment generates a signature for the malware sample.

In some embodiments, after the sample is determined to be malicious, the environment generates a signature for the malware sample, and distributes the signature to a firewall.

The process 500 provided at least the following benefits: the suspicious shellcode is split from RWE memory during the dynamic analysis of a sample and is located to identify candidate shellcode entry points using an shellcode filter; the process 500 can identify an exploit using any API function call instead of only a small number of sensitive API function calls; the process 500 can utilize a CPU emulator and a full system emulator; the process 500 has a very low false positive rate; the process 500 can work with many applications (e.g., browsers, Office, Acrobat, etc.), many operating systems (e.g., Windows, MacOS, Linux, etc.), and many platforms (e.g., x86/x64, ARM, ARM64, etc.); and the process 500 can potentially identify zero day exploits.

In some embodiments, the CPU emulation is performed before the full system emulation is performed because the CPU emulation is faster than the full system emulation and utilizes less resources, so in the event that the full system emulation is not needed, the process 500 can be performed quicker and less system resources are utilized.

Figure 6:
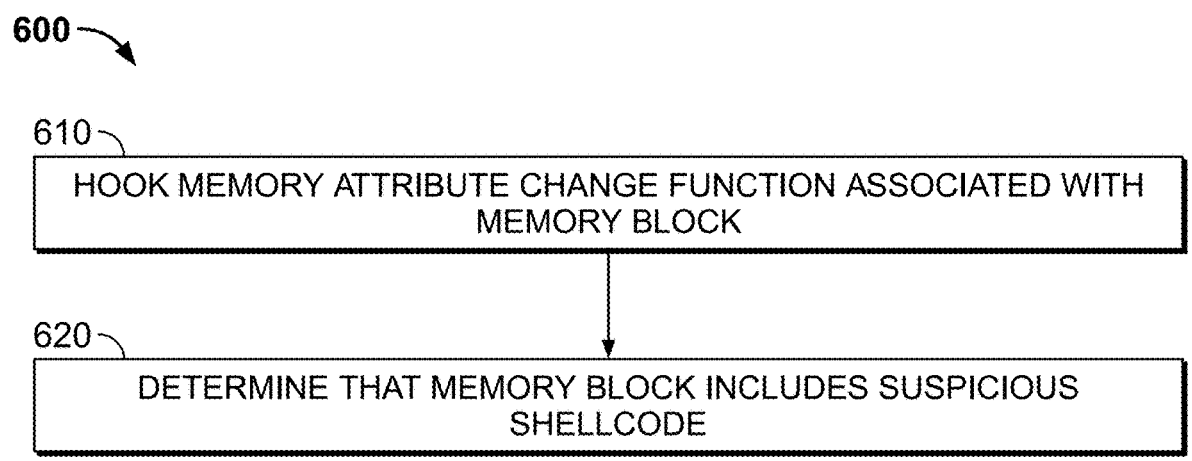
FIG. 6 illustrates an embodiment of a process for monitoring memory blocks during dynamic analysis of a sample.

FIG. 6 illustrates an embodiment of a process for monitoring memory blocks during dynamic analysis of a sample. In some embodiments, process 600 is an implementation of operation 510 of FIG. 5 and comprises:

In 610, the environment hooks a memory attribute change function associated with the memory block to determine whether a memory attribute change function has been called and a corresponding parameter has been provided to the memory attribute change function.

In 620, in the event that the memory attribute change function has been called and the corresponding parameter has been provided to the memory attribute change function, the environment determines that the memory block includes suspicious shellcode.

Figure 7:
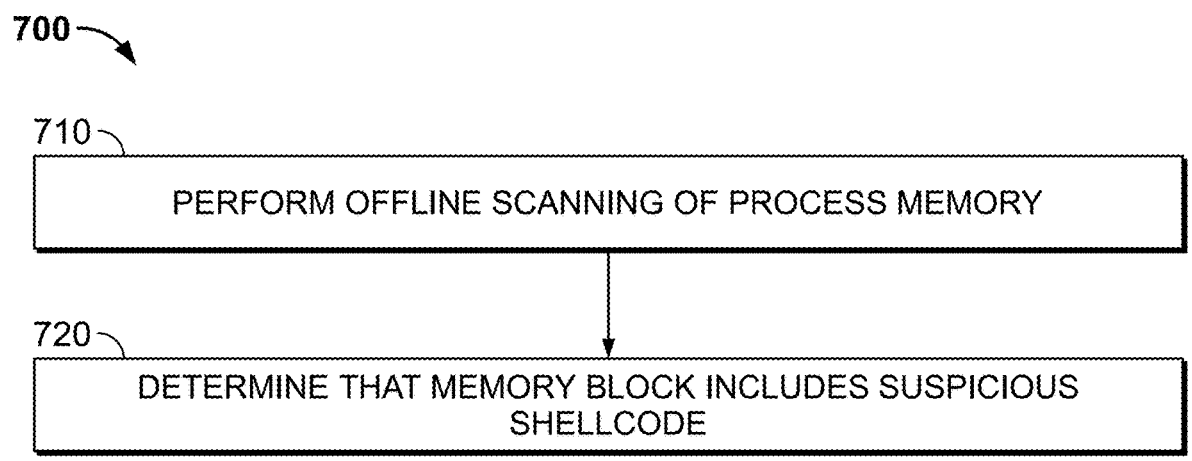
FIG. 7 illustrates another embodiment of a process for monitoring memory blocks during dynamic analysis of a sample.

FIG. 7 illustrates another embodiment of a process for monitoring memory blocks during dynamic analysis of a sample. In some embodiments, process 700 is an implementation of operation 510 of FIG. 5 and comprises:

In 710, after a process associated with a memory block is allowed to run, the environment performs an offline scanning of process memory to determine whether the memory block has a specific memory attribute.

In 720, in response to a determination that the memory block has the specific memory attribute, the environment determines that the memory block includes suspicious shellcode.

Figure 8:
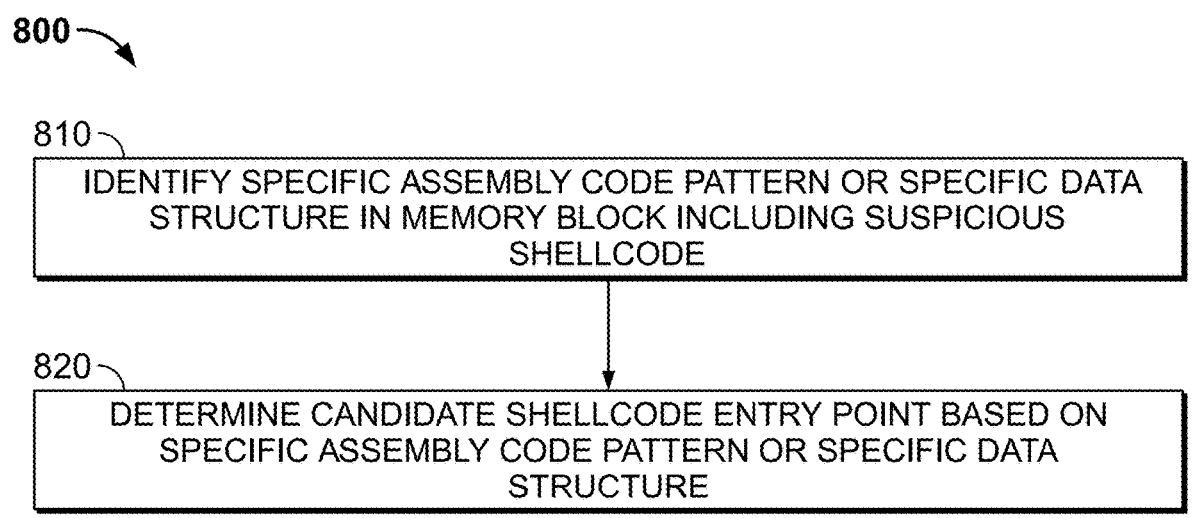
FIG. 8 illustrates an embodiment of a process for dumping a memory block in memory.

FIG. 8 illustrates an embodiment of a process for dumping a memory block in memory. In some embodiments, process 800 is an implementation of operation 520 of FIG. 5 and comprises:

In 810, the environment identifies a specific assembly code pattern or a specific data structure in the memory block including the suspicious shellcode.

In 820, the environment determines the candidate shellcode entry point based on the specific assembly code pattern or the specific data structure.

Figure 9:
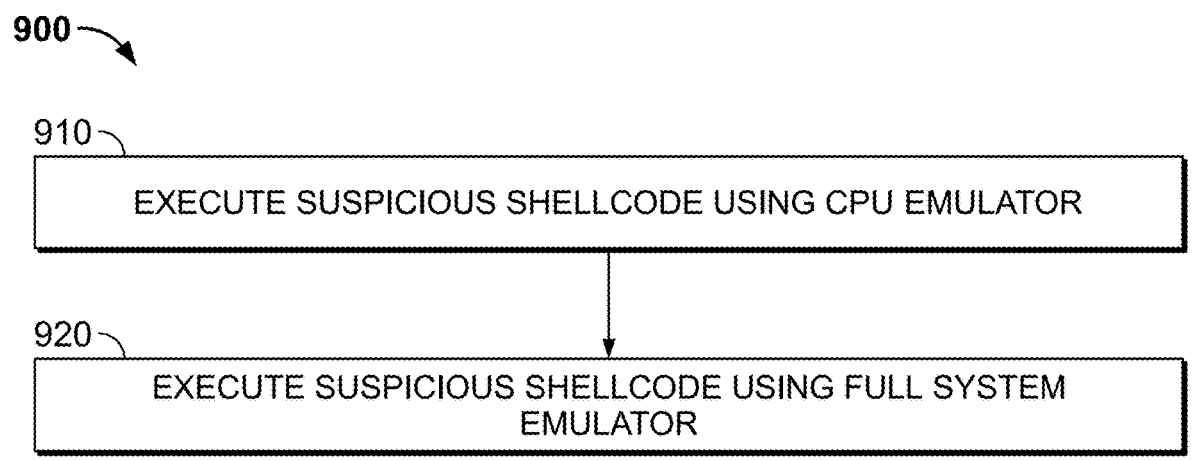
FIG. 9 illustrates an embodiment of a process for executing suspicious shellcode.

FIG. 9 illustrates an embodiment of a process for executing suspicious shellcode. In some embodiments, process 900 is an implementation of operation 530 of FIG. 5 and comprises:

In 910, the environment executes, based on a candidate shellcode entry point, the suspicious shellcode using a CPU emulator.

In some embodiments, after the suspicious shellcode using a CPU emulator is executed, an input binary is obtained.

In 920, the environment executes, based on the candidate shellcode entry point, the suspicious shellcode using a full system emulator.

In some embodiments, the obtained input binary from a CPU emulator is executed using the full system emulator.

Figure 10:
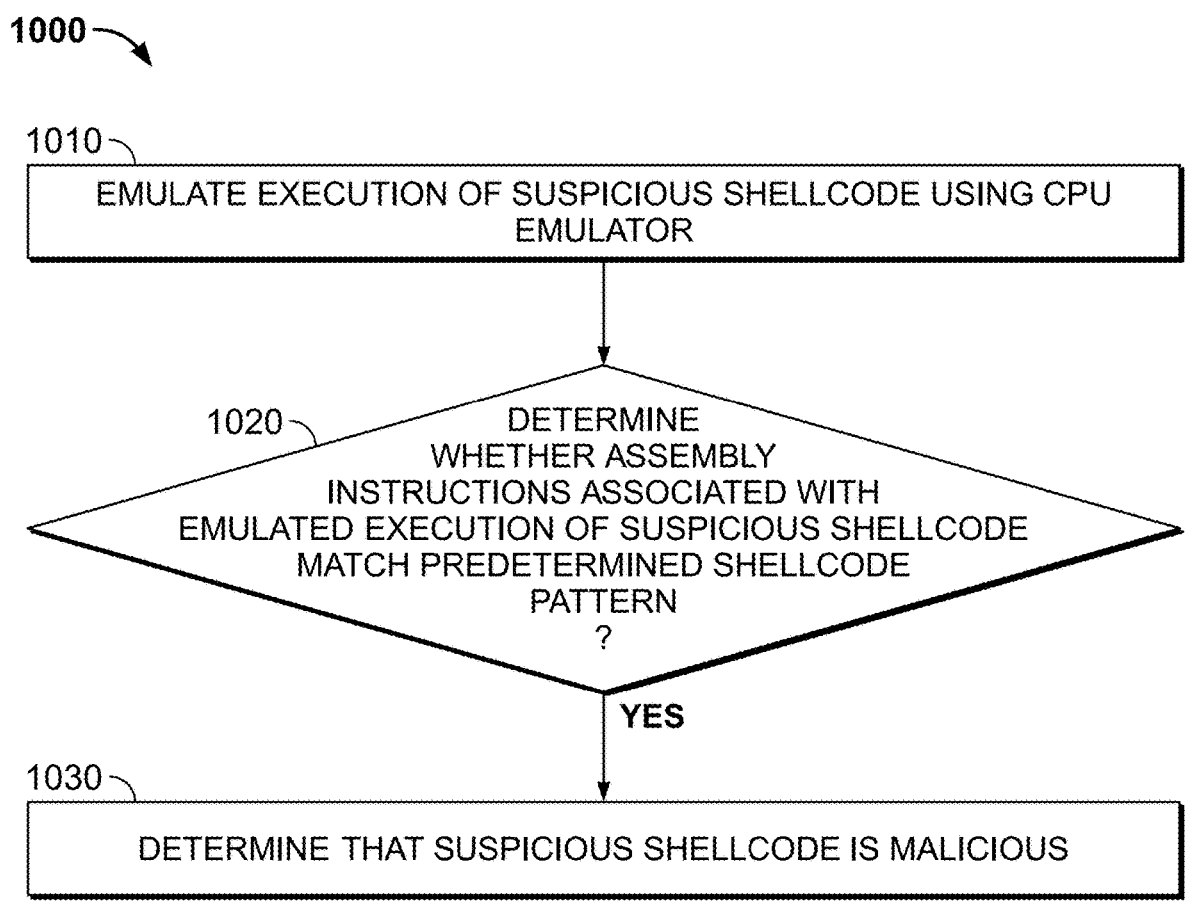
FIG. 10 illustrates an embodiment of a process for executing suspicious shellcode using a CPU emulator.

FIG. 10 illustrates an embodiment of a process for executing suspicious shellcode using a CPU emulator. In some embodiments, process 1000 is an implementation of operation 910 of FIG. 9 and comprises:

In 1010, the environment emulates execution of the suspicious shellcode using the CPU emulator.

In 1020, the environment determines whether assembly instructions associated with the emulated execution of the suspicious shellcode matches a predetermined shellcode pattern.

In 1030, in the event that the assembly instructions associated with the emulated execution of the suspicious shellcode matches the predetermined shellcode pattern, the environment determines that the suspicious shellcode is malicious.

Figure 11:
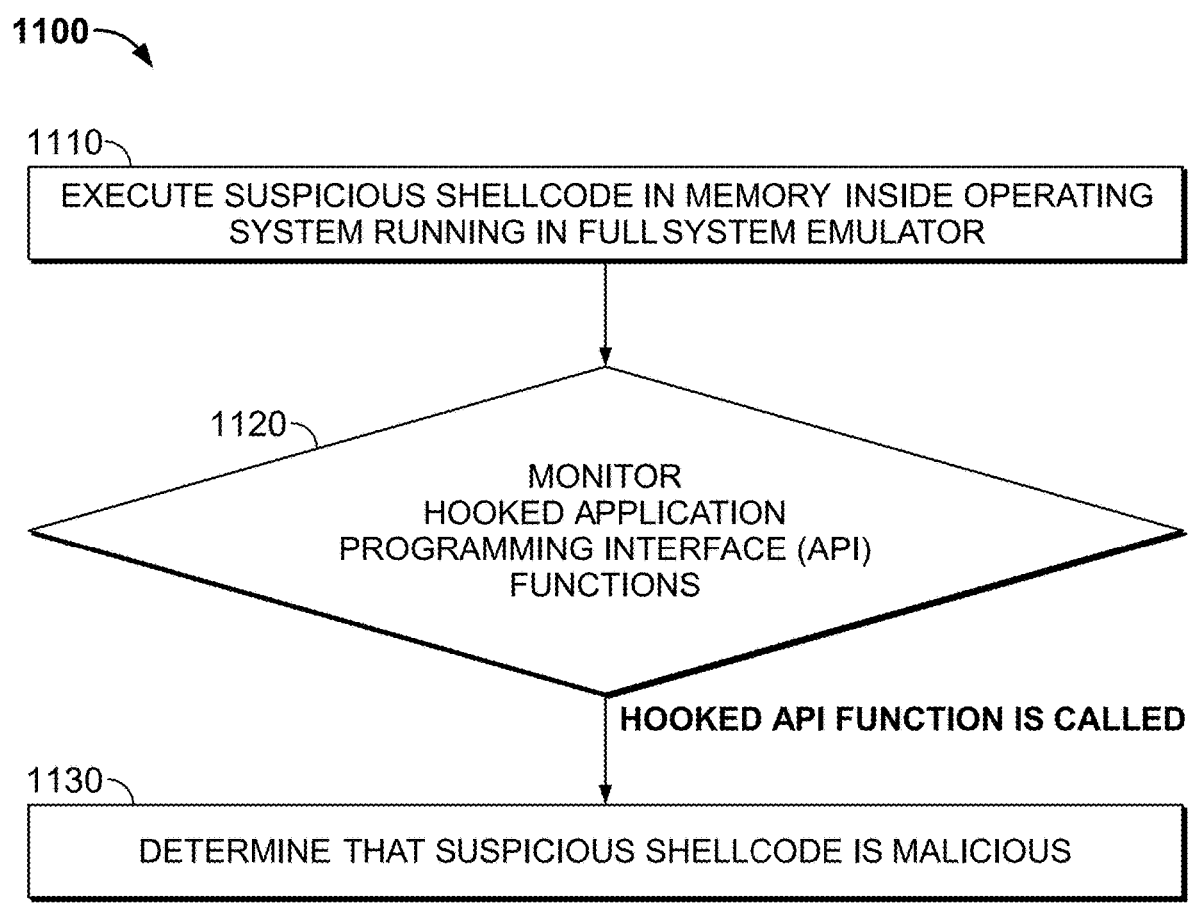
FIG. 11 illustrates an embodiment of a process for executing suspicious shellcode using a full system emulator.

FIG. 11 illustrates an embodiment of a process for executing suspicious shellcode using a full system emulator. In some embodiments, process 1100 is an implementation of operation 920 of FIG. 9 and comprises:

In 1110, the environment executes, based on candidate shellcode entry points, suspicious shellcode in a memory inside an operating system running in the full system emulator.

In 1120, the environment monitors hooked application programming interface (API) functions to determine whether the suspicious shellcode calls a hooked API function. In some embodiments, the environment hooks one or more API functions during full system emulation.

In 1130, in response to a determination that the suspicious shellcode calls the hooked API function, the environment determines that the suspicious shellcode is malicious.

FIG. 12 illustrates an example of a process for detecting an exploit including shellcode.

In the example, a sample (an exploit of CVE-2015-5119) is analyzed in the monitored environment where memory attribute change functions are monitored during dynamic analysis of the sample to identify memory blocks associated with the memory attribute change function. In the example, only one memory block including the suspicious shellcode is identified.

The memory block including the suspicious shellcode is identified by hooking the memory attribute change function called with RWE as the parameter, or by performing an offline scan of process memory after the sample has been executed (or at various points during execution) and analyzing the RWE memory attributes of the process memory to identify memory blocks including suspicious shellcode. After the memory blocks including suspicious shellcode are identified, the memory blocks are dumped.

The dumped memory block including the suspicious shellcode is analyzed for a list of regex expressions (e.g., PEB/TEB access, GETPC techniques, call functions, NOP, etc.). In the example, there were two matches ((1) a call function pattern, and (2) a TEB access pattern), and one candidate entry points associated with each of the two matches were also identified.

Suspicious shellcode based on the candidate entry points associated with each of the two matches are then executed.

The identified suspicious shellcode and the candidate entry points associated with the matches are fed into a CPU emulator. Assembly instruction level shellcode patterns are identified from the emulated assembly instructions in the CPU emulator to detect shellcode in the suspicious shellcode. In the example, TEB access, PEB access, and PEB Ldr access were identified. Subsequently, the input suspicious shellcode can be executed in memory in an operating system running a full system emulator where API function calls are monitored to detect the shellcode in the input suspicious shellcode. In the example, the API function calls: GetProcAddress (LdrGetProcedureAddress) and CreateThreadEx are identified. In the example, any monitored API function call that is identified can be treated as evidence for identifying the input suspicious shellcode as malicious shellcode. The output of each emulator is a verdict whether the sample is an exploit (malicious) or not, and verdict is determined is based on the execution results from the CPU emulator and/or full system emulator.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor memory blocks during dynamic analysis of a sample to identify a memory block including suspicious shellcode, comprising to:
perform an offline scanning of process memory to determine whether the memory block has a specific memory attribute, wherein the specific memory attribute includes memory block execute permissions (RWE); and
in response to a determination that the memory block has the specific memory attribute, determine that the memory block includes the suspicious shellcode;
dump the memory block in memory to identify a candidate shellcode entry point associated with the suspicious shellcode, comprising to:
identify a regex expression from the dumped memory block, wherein the regex expression includes one or more of the following: a data structure access or a GETPC instruction, wherein the data structure access includes one or more of the following: process environmental blocks (PEB) access and/or thread environmental blocks (TEB) access; and
determine the candidate shellcode entry point based on the identified regex expression;
execute, based on the candidate shellcode entry point, the suspicious shellcode to determine whether the suspicious shellcode is malicious; and
generate a verdict regarding the sample based on results of executing the suspicious shellcode; and
a memory coupled to the processor and configured to provide the processor with instructions.

2. The system of claim 1, wherein the dumping of the memory block in the memory to identify the candidate shellcode entry point associated with the suspicious shellcode comprises to:
identify a specific assembly code pattern or a specific data structure in the memory block including the suspicious shellcode; and
determine the candidate shellcode entry point based on the specific assembly code pattern or the specific data structure.

3. The system of claim 1, wherein the executing of the suspicious shellcode comprises to:
execute, based on the candidate shellcode entry point, the suspicious shellcode using a CPU emulator; and
execute, based on the candidate shellcode entry point, the suspicious shellcode using a full system emulator.

4. The system of claim 3, wherein the executing of the suspicious shellcode using the CPU emulator comprises to:
emulate execution of the suspicious shellcode using the CPU emulator;
determine whether assembly instructions associated with the emulated execution of the suspicious shellcode matches a predetermined shellcode pattern; and
in response to a determination that the assembly instructions associated with the emulated execution of the suspicious shellcode matches the predetermined shellcode pattern, determine that the suspicious shellcode is malicious.

5. The system of claim 3, wherein the executing of the suspicious shellcode using the full system emulator comprises to:
execute the suspicious shellcode in the memory inside an operating system running in the full system emulator;
monitor hooked application programming interface (API) functions to determine whether the suspicious shellcode calls a hooked API function; and
in response to a determination that the suspicious shellcode calls the hooked API function, determine that the suspicious shellcode is malicious.

6. The system of claim 1, wherein the processor is further configured to:

in response to a determination that the verdict indicates that the sample is malicious, generate a signature for the malware sample.

7. The system of claim 1, wherein the processor is further configured to:
in response to a determination that the verdict indicates that the sample is malicious:
generate a signature for the malware sample; and
distribute the signature to a firewall.

8. The system of claim 1, wherein the memory attribute change function includes VirtualAlloc.

9. The system of claim 1, wherein the GETPC instruction includes 1) fnstenv or 2) call reg, pop reg.

10. A method, comprising:
monitoring, using a processor, memory blocks during dynamic analysis of a sample to identify a memory block including suspicious shellcode, comprising:
performing an offline scanning of process memory to determine whether the memory block has a specific memory attribute, wherein the specific memory attribute includes memory block execute permissions (RWE); and
in response to a determination that the memory block has the specific memory attribute, determining that the memory block includes the suspicious shellcode;
dumping, using the processor, the memory block in memory to identify a candidate shellcode entry point associated with the suspicious shellcode, comprising:
identifying a regex expression from the dumped memory block, wherein the regex expression includes one or more of the following: a data structure access or a GETPC instruction, wherein the data structure access includes one or more of the following:
process environmental blocks (PEB) access and/or thread environmental blocks (TEB) access; and
determining the candidate shellcode entry point based on the identified regex expression;
executing, based on the candidate shellcode entry point, the suspicious shellcode to determine whether the suspicious shellcode is malicious using the processor; and
generating, using the processor, a verdict regarding the sample based on results of executing the suspicious shellcode.

11. The method of claim 10, wherein the executing of the suspicious shellcode comprises:
executing, based on the candidate shellcode entry point, the suspicious shellcode using a CPU emulator; and
executing, based on the candidate shellcode entry point, the suspicious shellcode using a full system emulator.

12. The method of claim 11, wherein the executing of the suspicious shellcode using the CPU emulator comprises:
emulating execution of the suspicious shellcode using the CPU emulator;
determining whether assembly instructions associated with the emulated execution of the suspicious shellcode matches a predetermined shellcode pattern; and
in response to a determination that the assembly instructions associated with the emulated execution of the suspicious shellcode matches the predetermined shellcode pattern, determining that the suspicious shellcode is malicious.

13. The method of claim 11, wherein the executing of the suspicious shellcode using the full system emulator comprises:
executing the suspicious shellcode in the memory inside an operating system running in the full system emulator;
monitoring hooked application programming interface (API) functions to determine whether the suspicious shellcode calls a hooked API function; and
in response to a determination that the suspicious shellcode calls the hooked API function, determining that the suspicious shellcode is malicious.

14. The method of claim 10, further comprising:
in response to a determination that the verdict indicates that the sample is malicious, generating a signature for the malware sample.

15. The method of claim 10, further comprising:
in response to a determination that the verdict indicates that the sample is malicious:
generating a signature for the malware sample; and
distributing the signature to a firewall.

16. The method of claim 10, wherein the memory attribute change function includes VirtualAlloc.

17. The method of claim 10, wherein the GETPC instruction includes 1) fnstenv or 2) call reg, pop reg.

18. A computer program product embodied in a non-transitory computer readable medium and comprising computer instructions for:
monitoring memory blocks during dynamic analysis of a sample to identify a memory block including suspicious shellcode, comprising:
performing an offline scanning of process memory to determine whether the memory block has a specific memory attribute, wherein the specific memory attribute includes memory block execute permissions (RWE); and
in response to a determination that the memory block has the specific memory attribute, determining that the memory block includes the suspicious shellcode;
dumping the memory block in memory to identify a candidate shellcode entry point associated with the suspicious shellcode, comprising:
identifying a regex expression from the dumped memory block, wherein the regex expression includes one or more of the following: a data structure access or a GETPC instruction, wherein the data structure access includes one or more of the following:
process environmental blocks (PEB) access and/or thread environmental blocks (TEB) access; and
determining the candidate shellcode entry point based on the identified regex expression;
executing, based on the candidate shellcode entry point, the suspicious shellcode to determine whether the suspicious shellcode is malicious; and
generating a verdict regarding the sample based on results of executing the suspicious shellcode.

\* \* \* \* \*